United States Patent
Barnes et al.

(10) Patent No.: US 11,413,783 B2
(45) Date of Patent: Aug. 16, 2022

(54) ENGINEERED FENCE PANELS AND PROCESS

(71) Applicant: LOUISIANA-PACIFIC CORPORATION, Nashville, TN (US)

(72) Inventors: Adina Barnes, Nashville, TN (US); Jarrod Kevin Line, Brentwood, TN (US); Gareth Paul Merrick, Gig Harbor, WA (US)

(73) Assignee: LOUISIANA-PACIFIC CORPORATION, Nashville, TN (US)

( * ) Notice: Subject to any disclaimer, the term of this patent is extended or adjusted under 35 U.S.C. 154(b) by 90 days.

(21) Appl. No.: 16/189,995

(22) Filed: Nov. 13, 2018

(65) Prior Publication Data
US 2019/0248039 A1    Aug. 15, 2019

Related U.S. Application Data

(60) Provisional application No. 62/585,087, filed on Nov. 13, 2017.

(51) Int. Cl.
*B27M 1/08* (2006.01)
*B32B 43/00* (2006.01)
(Continued)

(52) U.S. Cl.
CPC ............. *B27M 1/08* (2013.01); *B32B 43/003* (2013.01); *E04H 17/1426* (2013.01);
(Continued)

(58) Field of Classification Search
CPC ...... E04H 17/14; E04H 17/1426; B27M 1/08; B27M 3/002; B27M 3/0026; B27D 1/10; B32B 43/003; B32B 37/18; B32B 39/00
See application file for complete search history.

(56) References Cited

U.S. PATENT DOCUMENTS 2,534,681 A * 12/1950 Boardman .......... E04H 17/1426
                                                               256/24
3,234,979 A * 2/1966 Armitage .................. B27M 3/32
                                                               144/162.1

(Continued)

FOREIGN PATENT DOCUMENTS

DE       1126694 A1    2/1993
EP        2944461 A1    11/2015
(Continued)

OTHER PUBLICATIONS

International Search Report and Preliminary Examination Report, PCT/US2018/060844, filed Nov. 13, 2018, published May 16, 2019 (Louisiana-Pacific Corp.).

*Primary Examiner* — Philip C Tucker
*Assistant Examiner* — Jimmy R Smith, Jr.
(74) *Attorney, Agent, or Firm* — W. Edward Ramage; Baker Donelson

(57) ABSTRACT

A system and methods for manufacturing and constructing a fence panel or pickets using engineered wood products, including, but not limited to, oriented-strand board (OSB), fiber strand, or laminated strand lumber. An entire piece of durable, treated engineered wood panel is divided into multiple "fence blanks" of equal size. Each fence blank is then subjected to edge profiling on top and bottom edges, and top feature milling to create fence top features, with finishing, texture, printing, paper overlay, or combinations thereof, added to one or both faces of the blank. Blanks may be milled in a stack. Blanks may then have grooves or other finishing features added to create a finished fence panel. Alternatively, a fence blank can be slit or cut into multiple raw pickets, also with finishing treatments to one or both faces, to create a series of raw pickets. The resulting finished fence panel or pickets provide the authentic look and appeal (Continued)

of real wood, but with the advantages of treated engineered wood.

14 Claims, 4 Drawing Sheets

(51) Int. Cl.
*B32B 37/00* (2006.01)
*E04H 17/14* (2006.01)
*E04H 17/16* (2006.01)
*B32B 37/18* (2006.01)

(52) U.S. Cl.
CPC .......... *E04H 17/16* (2013.01); *B32B 37/0046* (2013.01); *B32B 37/18* (2013.01); *E04H 17/14* (2013.01); *E04H 17/168* (2013.01)

(56) References Cited

U.S. PATENT DOCUMENTS

| | | | | |
|---|---|---|---|---|
| 3,502,303 | A | * | 3/1970 | Bishop .................... E04H 17/12 256/48 |
| 6,123,160 | A | | 9/2000 | Borris et al. |
| 10,350,785 | B2 | * | 7/2019 | Costa ..................... B27N 3/143 |
| 2003/0029109 | A1 | * | 2/2003 | Hellberg ................. E04F 13/10 52/311.1 |
| 2007/0154689 | A1 | | 7/2007 | Hughes et al. |
| 2012/0141785 | A1 | * | 6/2012 | Lowrey ................... B05D 7/54 428/339 |
| 2017/0081873 | A1 | * | 3/2017 | Crawford .............. E04H 17/165 |

FOREIGN PATENT DOCUMENTS

| | | | | |
|---|---|---|---|---|
| GB | 842129 | A | * 7/1960 | ............ E04C 2/386 |
| GB | 2377457 | A | 1/2003 | |

* cited by examiner

ENGINEERED FENCE PANELS AND PROCESS

This application claims benefit of and priority to U.S. Provisional Application No. 62/585,087, filed Nov. 13, 2017, which is incorporated herein in its entirety by specific reference for all purposes.

FIELD OF INVENTION

This invention relates to a system for an engineered fence panel comprising engineered wood components.

DETAILED DESCRIPTION OF EXEMPLARY EMBODIMENTS

In various exemplary embodiments, the present invention comprises a system for constructing a fence panel or pickets using treated engineered wood products, including, but not limited to, oriented-strand board (OSB), fiberboard, laminated strand lumber (LSL), plywood or laminated veneer lumber (LVL). Engineered wood products provide the authentic look and appeal of real wood, but with the advantages of treated engineered wood. With the present invention, an improved fence can be assembled more quickly and cheaply than with any prior art materials, and the fence will be higher quality, with longer life, thinner and lighter, and minimal maintenance.

Figure 1:
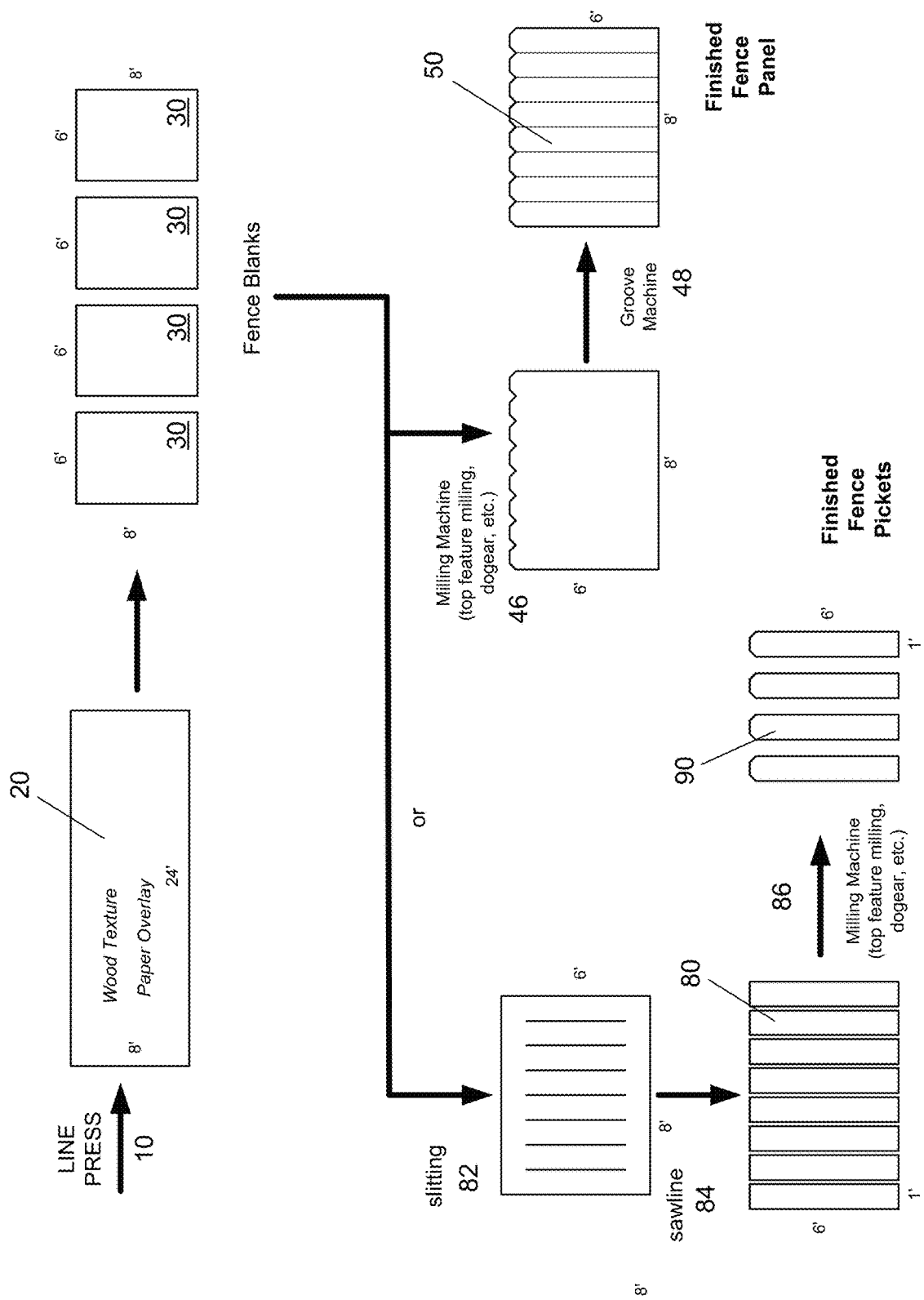
FIG. 1 shows a view of an exemplary embodiment of the present invention.

As seen in FIG. 1, the process begins with an entire piece of durable, treated, or premium grade engineered wood panel 20, which comes out of a line press 10 with a wood texture or other texture (e.g., screen, smooth, cedar, or the like) on one or both faces of the panel. The panel also may or may not have a paper overlay on one or both faces. The paper overlay may be treated with resin or resin-impregnated, or may be primed. In the embodiment shown, the panel is approximately 8 feet by 24 feet in dimension, although the panel may be other sizes as well.

The panel then is sawn by one or more saws into multiple equal sections or "blanks" 30. Where the panel is approximately 8 feet by 24 feet in dimension, the blanks may be four blanks approximately 6 feet by 8 feet in dimension (see FIG. 1), or eight blanks approximately 4 feet by 6 feet in dimension (see FIG. 2). The number and orientation of the blanks as cut may be based on the wood grain orientation in the panel. For example, the blanks may be cut so that the wood grain orientation with respect to the long side of the panel is maintained with respect to the long side of the blanks. The opposite orientation may be desired for some applications. Each blank is then subjected to further processing, as described below.

In one embodiment, where the blank 30 is intended for ultimate use as a finished fence panel 50, the fence blank is sent to a milling machine or notching saw 46, which mills one edge of the blank to create a top fence line (e.g., a series of notches, indentations, grooves, dog ears, curved ends, and the like as the top feature). In several embodiments, the fence blanks are aligned and stacked, and are then processed by the milling machine as a stack (i.e., the top fence line cuts are made to all blanks in the stack). In one embodiment, up to 90 blanks are processed as a stack. This provides greater efficiency in processing of the blanks.

Additional finishing or texture may be added to the face(s) of the blank as well (e.g., a saw or groove machine 48 may be used add lines or grooves in one or both faces of the blank to simulate pickets or other surface features). The resulting product is a finished fence panel 50 ready for installation.

Figure 3:
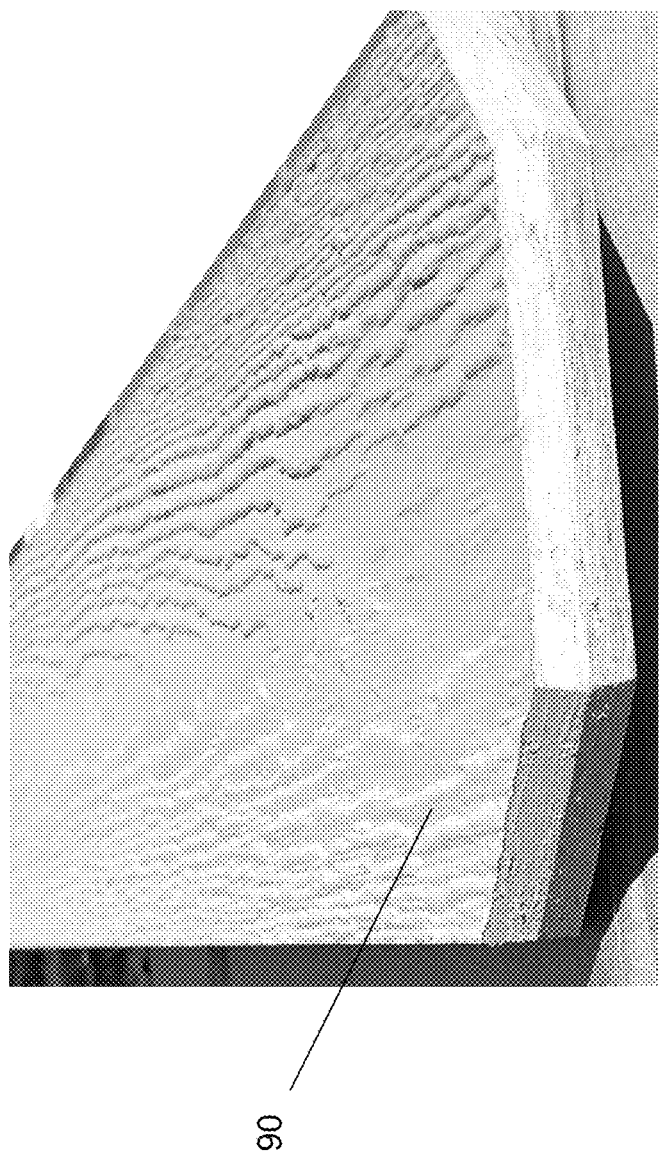
FIGS. 3 and 4 show view of a dog ear feature at the top of a fence picket.
Figure 4:
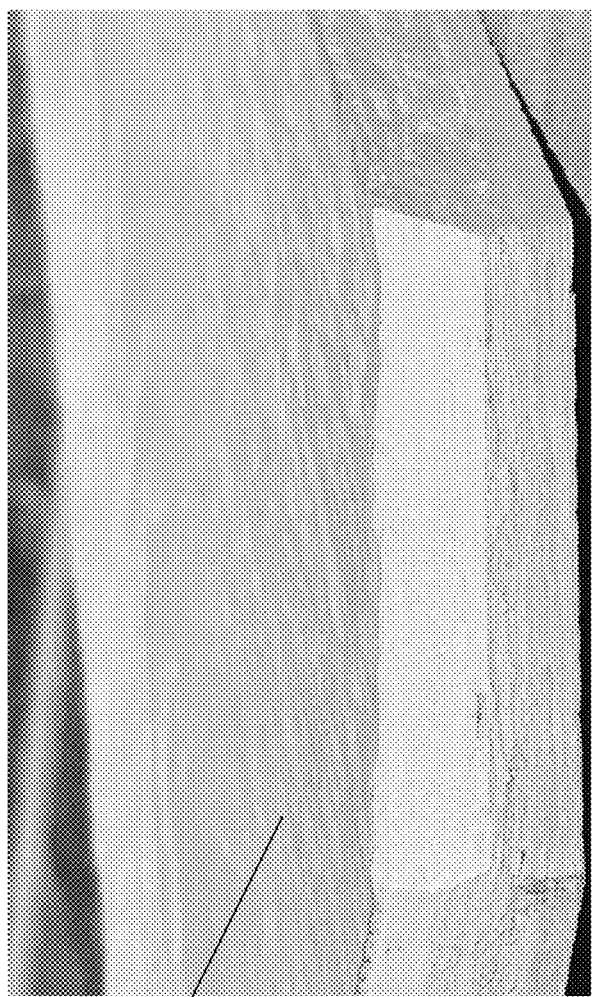

Edge profiling may also be performed (at variable points in the process) on the top edge (i.e., what will be the top edge), to achieve a desired cross-section profile (e.g., a round or angled profile to promote water run-off, a watershed, a drip edge, or a desired aesthetic effect), as seen in FIGS. 3 and 4. While a square cut may be used, edge profiling also may be performed on the "bottom" edge (with the bottom edge trimmed as needed during installation to maintain an even top line). In one embodiment, the edge profile is at a 22-degree angle with respect to the edge plane or the face plane. Edge profiling may be performed on the blank prior to or after milling of the top features, and may be on some or all edges of the top feature.

Where the blank is intended for ultimate use as a plurality of fence pickets, the blank is sent to a slitting machine 82 and/or multiple saw or gang saw line 84 where the blank is cut into a number of long raw pickets 80. All pickets from a blank may be cut simultaneously. The sides of the raw pickets generally extend downward from the corresponding low points in the milled top feature, with the long side of the picket aligned with the long side of the blank. In several embodiments, the raw pickets are 6 inches to 12 inches wide, and 6 feet in length. The raw pickets 80 are then directed to a milling machine 86, where one end of each picket is milled as described above to create a top feature. Additional finishing or texture may be added to the face(s) of the pickets (or blank, pre-cutting) as well, and the top edge(s) may profiled, as described above. The resulting product is a number of finished fence pickets 90 ready for installation.

Figure 2:
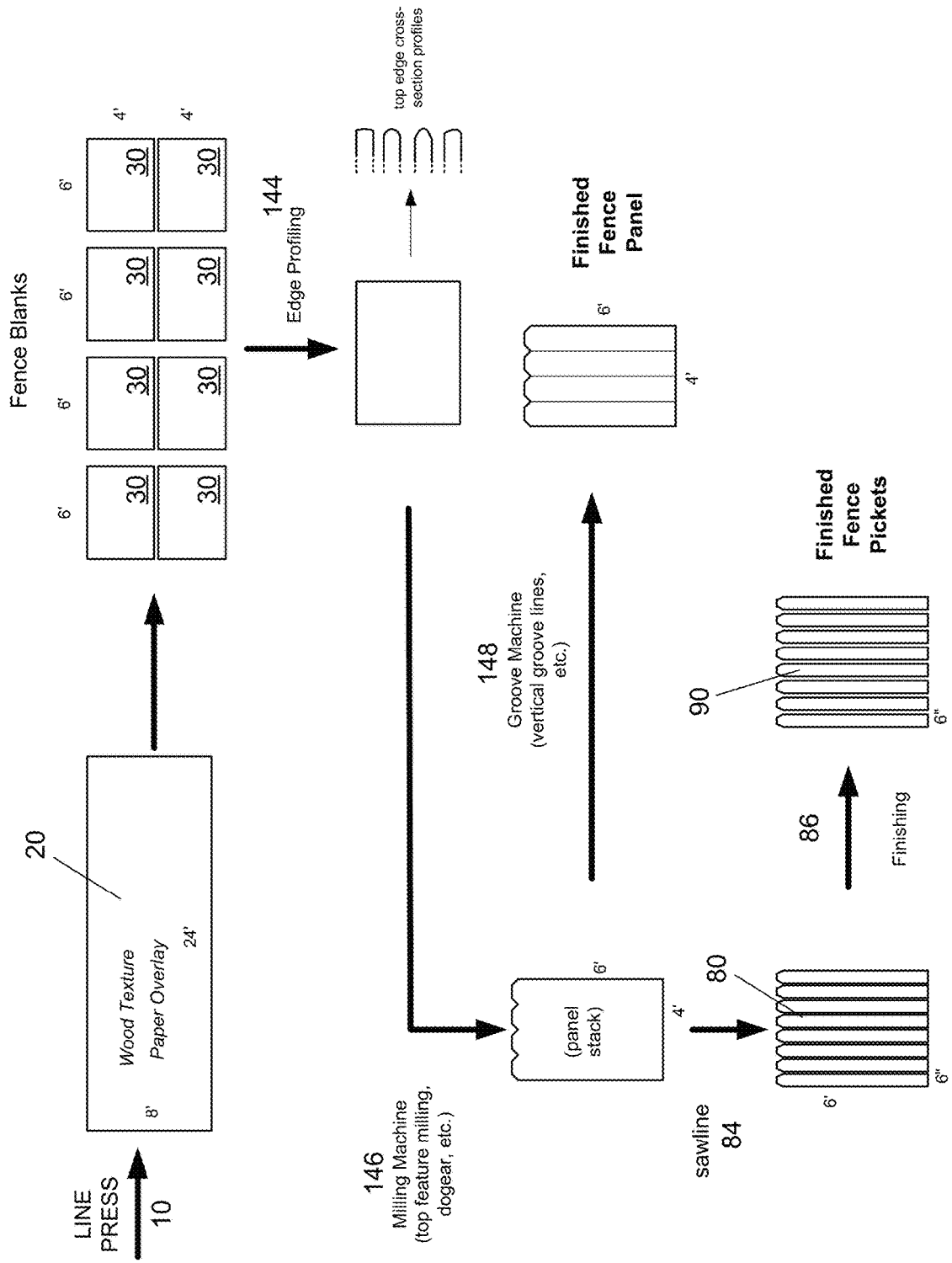
FIG. 2 shows a view of another exemplary embodiment of the present invention.

FIG. 2 shows an alternative manufacturing line sequence. In this example, the panel 20 is sawn into eight 4' by 6' panels. Edge profiling 144 of each panel may then be performed. Panels may then be stacked and processed by a milling machine 146 to create a top fence line (e.g., a series of notches, indentations, grooves, dog ears, curved ends, and the like as the top feature), as described above, on the panels in the stack. After milling, each blank is then subjected to further processing, depending on the desired end product. Where the end product is a finished fence panel, the panel is processed by a groove machine or saw 148 to add vertical groove lines or other additional finishing or texture on one or both faces, as described above. Where the end produce is a set of finished fence pickets, the panel is then processed by a saw line 84 which saws the panel into a series of raw pickets which are then subject to finishing 86, as described above.

Accordingly, the present invention provides an exterior fence with enhanced durability, weather-resistance, fade resistance, and aesthetics at a lower cost and faster installation as compared to prior art fences and materials.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. . A method of manufacturing an engineered wood fence product, comprising:
   producing, in a press line, an engineered wood panel with a front side and a back side, and a length and a width;
   applying a texture or paper overlay to one or both sides of the panel;
   after the step of applying the texture or paper overlay, producing a plurality of equal-sized rectilinear fence blanks by cutting the panel across its width at several points and/or across its length, with each fence blank comprising a front side, a back side, a top edge, a bottom edge, a right side edge orthogonal to the bottom edge, and a left side edge parallel to the right side edge;
   profiling the top edge of each fence blank with a curve or angle in cross-section;
   milling the top edge of each fence blank to produce one or more top features; and
   cutting a plurality of parallel grooves in at least one face of each fence blank, but not extending through the fence blank, orthogonally to the top edge at several points to produce the appearance of a plurality of contiguous fence pickets on the face of each fence blank;
   wherein each fence blank, after the step of cutting the plurality of parallel groves, comprises a rectilinear interior with four edges, wherein the interior extends continuously between said four edges.

2. The method of claim 1, wherein both the top edge and bottom edge are profiled.

3. The method of claim 1, wherein the one or more top features constitute one or more of a notch, indentation, groove, dog ear, or curved end.

4. The method of claim 1, wherein the engineered wood panel comprises oriented-strand board.

5. The method of claim 1, wherein the engineered wood panel comprises laminated strand lumber or laminated veneer lumber.

6. The method of claim 1, wherein the engineered wood panel has a wood grain orientation with respect to the length of the engineered wood panel, and the fence blanks are cut so the wood grain orientation is maintained to a long edge of each fence blank.

7. The method of claim 1, wherein the fence blanks are milled as a stack of fence blanks.

8. The method of claim 1, wherein the texture comprises a screen texture or a cedar texture.

9. The method of claim 1, wherein the paper overlay comprises a resin-impregnated paper overlay.

10. The method of claim 9, wherein the paper overlay comprises a primed paper overlay.

11. The method of claim 1, wherein the top edge profile is rounded.

12. The method of claim 1, wherein the top edge profile comprises a drip edge.

13. The method of claim 1, wherein the top edge profile is configured to promote water run-off.

14. The method of claim 1, wherein the top edge profile comprises a 22-degree angle with respect to a face plane or an edge plane.

* * * * *